United States Patent [19]

Kadakia et al.

[11] 4,425,582
[45] Jan. 10, 1984

[54] HARDWARE IMPLEMENTATION OF 2 LINE/11 ELEMENT PREDICTOR

[75] Inventors: Vinod K. Kadakia, Torrance; Glen D. Jones, Orange, both of Calif.

[73] Assignee: Xerox Corporation, Stamford, Conn.

[21] Appl. No.: 293,815

[22] Filed: Aug. 17, 1981

Related U.S. Application Data

[63] Continuation-in-part of Ser. No. 165,814, Jul. 3, 1980, abandoned.

[51] Int. Cl.$^3$ .................. H04N 1/41; H03K 13/243
[52] U.S. Cl. ................. 358/260; 340/347 DD; 382/41
[58] Field of Search ............ 358/260, 261, 283; 364/515; 340/347 DD; 382/41, 56

[56] References Cited

U.S. PATENT DOCUMENTS

| | | | |
|---|---|---|---|
| 4,028,731 | 6/1977 | Arps | 358/261 |
| 4,293,920 | 10/1981 | Merola | 358/260 |
| 4,325,085 | 4/1982 | Gooch | 364/515 |
| 4,355,306 | 10/1982 | Mitchell | 358/260 |

*Primary Examiner*—Howard Britton
*Attorney, Agent, or Firm*—Robert E. Cunha

[57] ABSTRACT

A predictor bit pattern comprising selected bits of the current and previous raster scan lines and a method of predicting a plurality of bits per clock are disposed. Generally, a predictor is used prior to the encoding of data to increase the compression. The current bit in a bit stream is compared to the predicted value and a one is output when the two values are not equal. An efficient predictor will reduce the number of ones in a bit stream, which increases the zero run lengths and increases the efficiency of a run length encoding system. The described bit pattern contains bits close to the current bit to efficiently predict text data, bits distant from the current bit to efficiently predict halftone data, and ignores a plurality of intermediate bits to reduce hardware costs. A two step process is also described to allow a plurality of bits to be predicted in parallel. A circuit for performing this process comprises a buffer for storing the previous and current line data, two registers for holding the previous and current line prediction data patterns and two PROMs for performing the two step prediction.

10 Claims, 16 Drawing Figures

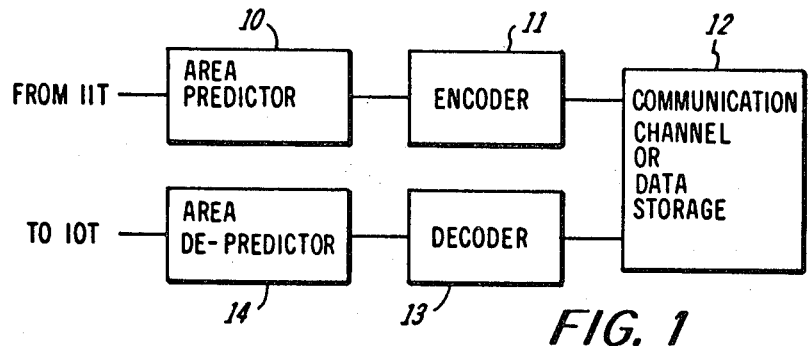
FIG. 1
FIG. 2 PRIOR ART
FIG. 3
FIG. 4
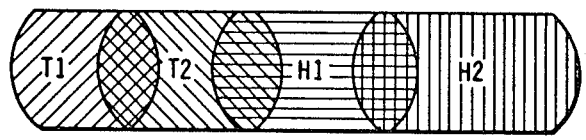
FIG. 5

|  | PREDICTORS | | | | |
|---|---|---|---|---|---|
| DOCUMENT | PRT1 | PRT2 | PRH1 | PRH2 | PVA |
| T1 | .62 | .63 | 1.12 | 1.12 | .64 |
| T2 | .52 | .52 | .93 | 1.21 | .54 |
| H1 | 23.02 | 15.50 | 2.60 | 34.79 | 3.24 |
| H2 | 22.24 | 20.27 | 32.68 | 6.96 | 11.59 |

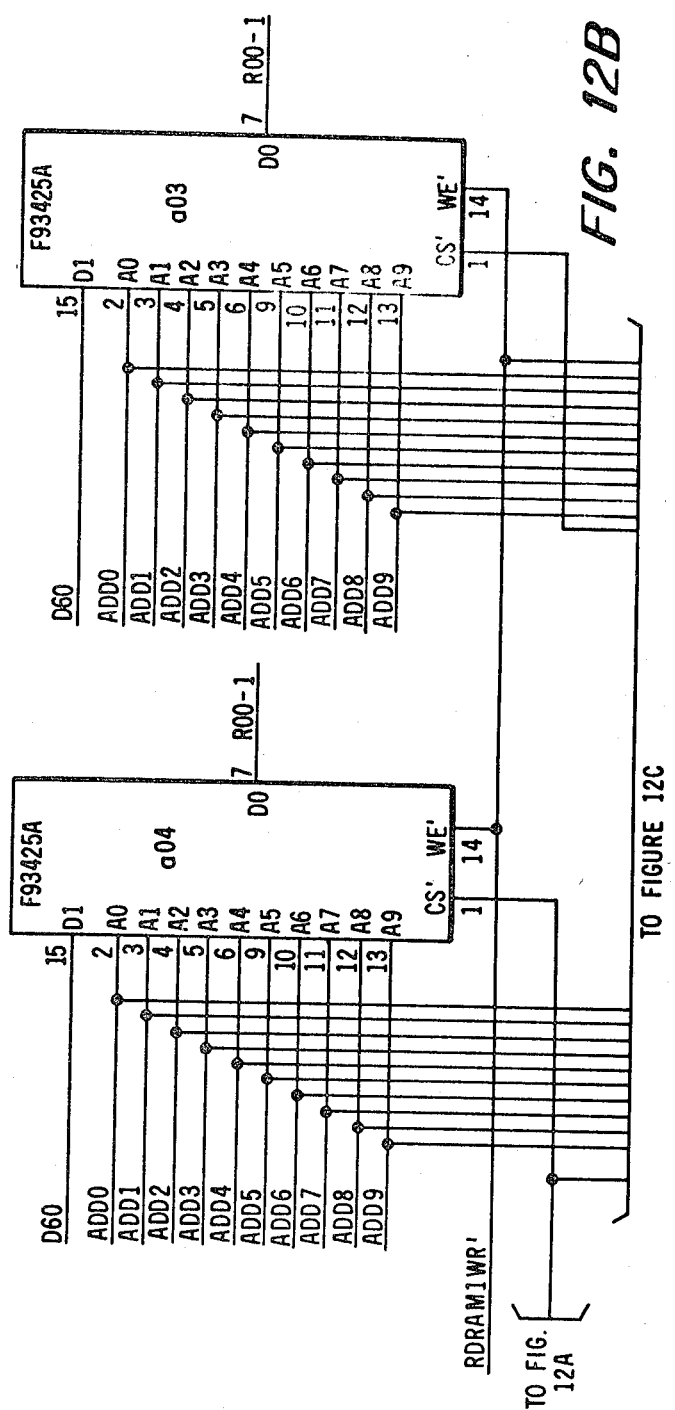

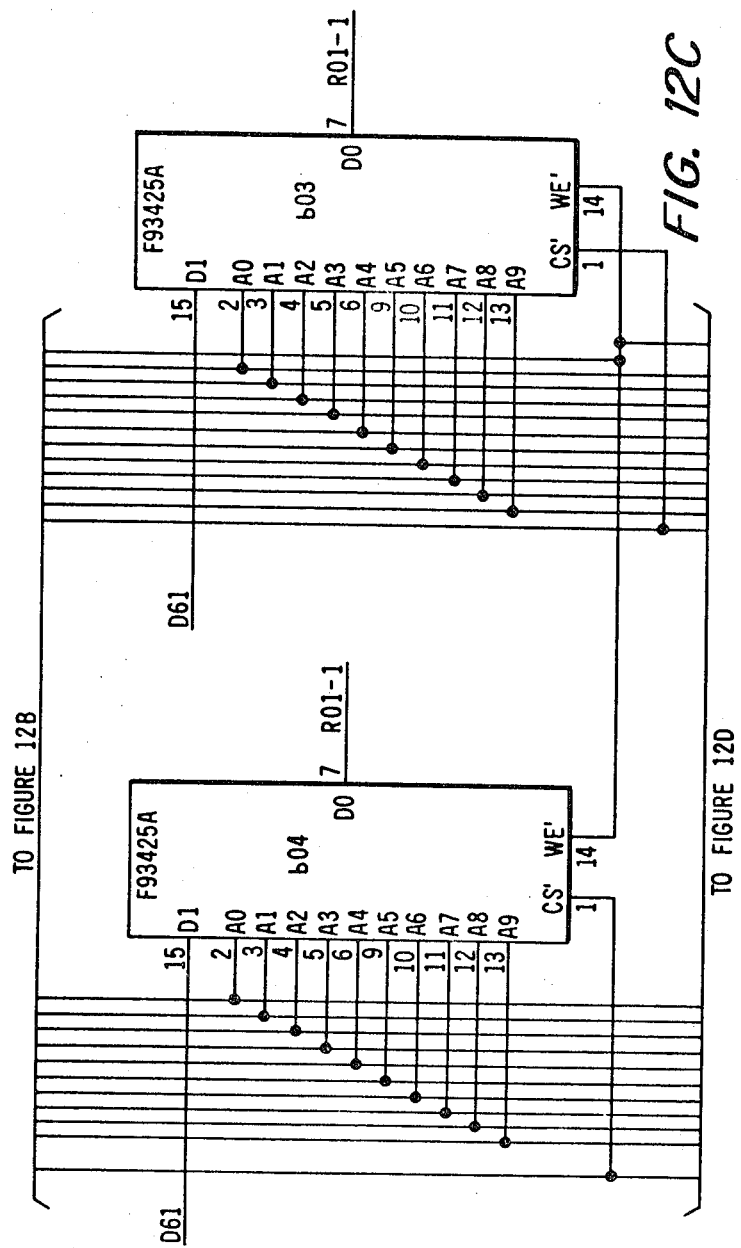

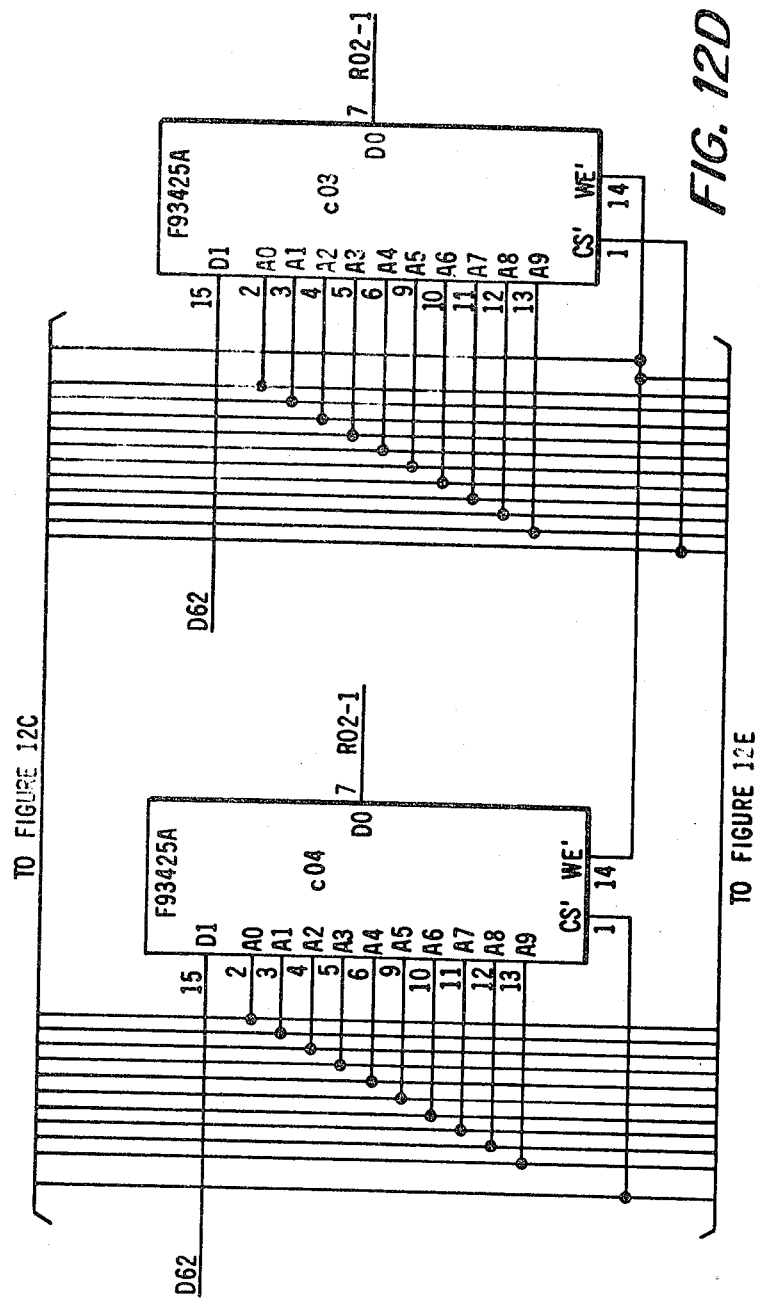

ERROR PROM

CONTROL PROM FOR E0+C0 & E1+C1

| INPUTS | | | | | | | | OUTPUTS | |
|---|---|---|---|---|---|---|---|---|---|
| A0 SELCMD | A1 D21 | A2 P1-0H | A3 P1-1H | A4 P0-0H | A5 P0-1H | A6 D20 | A7 D13 | Q2 E0+C0 | Q3 E1+C1 |
| 0 | X | X | X | 0 | X | 0 | 0 | 0 | - |
| 0 | X | X | X | X | 0 | 0 | 1 | 0 | - |
| 0 | X | X | X | 0 | X | 1 | 0 | 1 | - |
| 0 | X | X | X | X | 0 | 1 | 1 | 1 | - |
| 0 | X | X | X | X | 1 | 0 | 1 | 1 | - |
| 0 | X | X | X | X | 1 | 1 | 1 | 0 | - |
| 0 | X | X | X | 1 | X | 0 | 0 | 1 | - |
| 0 | X | X | X | 1 | X | 1 | 0 | 0 | - |
| 1 | X | X | X | X | X | 0 | X | 0 | - |
| 1 | X | X | X | X | X | 1 | X | 1 | - |
| 0 | 0 | 0 | X | X | X | 0 | X | - | 0 |
| 0 | 0 | X | 0 | X | X | 1 | X | - | 0 |
| 0 | 0 | X | 1 | X | X | 1 | X | - | 1 |
| 0 | 0 | 1 | X | X | X | 0 | X | - | 1 |
| 0 | 1 | 0 | X | X | X | 0 | X | - | 1 |
| 0 | 1 | X | 0 | X | X | 1 | X | - | 1 |
| 0 | 1 | X | 1 | X | X | 1 | X | - | 0 |
| 0 | 1 | 1 | X | X | X | 0 | X | - | 0 |
| 1 | 0 | X | X | X | X | X | X | - | 0 |
| 1 | 1 | X | X | X | X | X | X | - | 1 |

E0+C0 = SEL CMD · D20 + SEL CMD' · D13' · (D20 · P0-0H' + D20' · P0-0H)
+ SEL CMD' · D13 · (D20 · P0-1H' + D20' · P0-1H)

E1+C1 = SEL CMD · D21 + SEL CMD' · D20' · (D21 · P1-0H' + D21' · P1-0H)
+ SEL CMD' · D20 · (D21 · P1-1H' + D21' · P1-1H)

X = DON'T CARE

*FIG. 13A*

ERROR PROM
CONTROL PROM FOR E2 + C2 & E3 + C3

| INPUTS | | | | | | | | OUTPUTS | |
|---|---|---|---|---|---|---|---|---|---|
| A0 Sel Cmd | A1 D23 | A2 P3-0H | A3 P3-1H | A4 P2-0H | A5 P2-1H | A6 D22 | A7 D21 | Q2 E2+C2 | Q3 E3+C3 |
| 0 | X | X | X | 0 | X | 0 | 0 | 0 | - |
| 0 | X | X | X | X | 0 | 0 | 1 | 0 | - |
| 0 | X | X | X | 0 | X | 1 | 0 | 1 | - |
| 0 | X | X | X | X | 0 | 1 | 1 | 1 | - |
| 0 | X | X | X | X | 1 | 0 | 1 | 1 | - |
| 0 | X | X | X | X | 1 | 1 | 1 | 0 | - |
| 0 | X | X | X | 1 | X | 0 | 0 | 1 | - |
| 0 | X | X | X | 1 | X | 1 | 0 | 0 | - |
| 1 | X | X | X | X | X | 0 | X | 0 | - |
| 1 | X | X | X | X | X | 1 | X | 1 | - |
| 0 | 0 | 0 | X | X | X | 0 | X | - | 0 |
| 0 | 0 | X | 0 | X | X | 1 | X | - | 0 |
| 0 | 0 | X | 1 | X | X | 1 | X | - | 1 |
| 0 | 0 | 1 | X | X | X | 0 | X | - | 1 |
| 0 | 1 | 0 | X | X | X | 0 | X | - | 1 |
| 0 | 1 | X | 0 | X | X | 1 | X | - | 1 |
| 0 | 1 | X | 1 | X | X | 1 | X | - | 0 |
| 0 | 1 | 1 | X | X | X | 0 | X | - | 0 |
| 1 | 0 | X | X | X | X | X | X | - | 0 |
| 1 | 1 | X | X | X | X | X | X | - | 1 |

E2 + C2 = SelCmd · D22 + SelCmd' · D21' · (D22 · P2-0H' + D22' · P2-0H)
$\qquad$ + SelCmd' · D21 · (D22 · P2-1H' + D22' · P2-0H)

E3 + C3 = SelCmd · D23 + SelCmd' · D22' · (D23 · P3-0H' + D23' · P3-0H)
$\qquad$ + SelCmd' · D22 · (D23 · P3-1H' + D23' · P3-1H)

X = DON'T CARE

*FIG. 13B*

| | | | | | | | |
|---|---|---|---|---|---|---|---|
| 2B, | 2B, | 0B, | 2B, | 1B, | 2B, | 3B, | 2B, |
| 0B, | 3B, | 2B, | 2B, | 2B, | 2B, | 2B, | 2B, |
| 2B, | 2B, | 2B, | 2B, | 0B, | 2B, | 2B, | 2B, |
| 2B, | 3B, | 2B, | 2B, | 2B, | 2B, | 2B, | 2B, |
| 2B, | 2B, | 0B, | 3B, | 0B, | 0B, | 0B, | 2B, |
| 0B, | 3B, | 0B, | 2B, | 2B, | 3B, | 0B, | 2B, |
| 2B, | 2B, | 2B, | 2B, | 0B, | 2B, | 2B, | 2B, |
| 0B, | 3B, | 2B, | 2B, | 2B, | 2B, | 2B, | 2B, |
| 2B, | 3B, | 3B, | 3B, | 2B, | 3B, | 2B, | 2B, |
| 2B, | 3B, | 3B, | 3B, | 2B, | 3B, | 0B, | 2B, |
| 2B, | 2B, | 2B, | 2B, | 3B, | 3B, | 2B, | 3B, |
| 2B, | 3B, | 2B, | 2B, | 2B, | 0B, | 3B, | 2B, |
| 2B, | 2B, | 0B, | 3B, | 3B, | 3B, | 2B, | 2B, |
| 2B, | 2B, | 0B, | 3B, | 2B, | 3B, | 1B, | 3B, |
| 3B, | 3B, | 3B, | 3B, | 3B, | 3B, | 2B, | 3B, |
| 3B, | 3B, | 2B, | 3B, | 3B, | 3B, | 3B, | 3B, |
| 0B, | 2B, | 0B, | 3B, | 2B, | 0B, | 3B, | 0B, |
| 0B, | 2B, | 0B, | 3B, | 2B, | 0B, | 0B, | 2B, |
| 0B, | 2B, | 0B, | 2B, | 0B, | 2B, | 2B, | 2B, |
| 0B, | 2B, | 0B, | 3B, | 0B, | 2B, | 0B, | 2B, |
| 0B, | 2B, | 0B, | 0B, | 0B, | 2B, | 2B, | 2B, |
| 2B, | 2B, | 0B, | 2B, | 0B, | 0B, | 0B, | 0B, |
| 2B, | 0B, | 0B, | 0B, | 0B, | 0B, | 0B, | 2B, |
| 2B, | 2B, | 0B, | 2B, | 2B, | 0B, | 1B, | 3B, |
| 1B, | 3B, | 0B, | 0B, | 0B, | 0B, | 2B, | 2B, |
| 2B, | 2B, | 2B, | 2B, | 2B, | 2B, | 2B, | 2B, |
| 2B, | 2B, | 2B, | 2B, | 2B, | 3B, | 2B, | 2B, |
| 2B, | 2B, | 2B, | 3B, | 2B, | 2B, | 2B, | 2B, |
| 3B, | 3B, | 2B, | 2B, | 2B, | 3B, | 3B, | 3B, |
| 2B, | 2B, | 2B, | 2B, | 2B, | 0B, | 2B, | 2B, |
| 3B, | 2B, | 2B, | 2B, | 3B, | 2B, | 3B, | 2B, |
| 2B, | 2B, | 3B, | 3B, | 2B, | 2B, | 3B, | 3B, |
| 3B, | 3B, | 2B, | 2B, | 3B, | 3B, | 3B, | 3B, |
| 0B, | 0B, | 0B, | 0B, | 3B, | 0B, | 3B, | 2B, |
| 2B, | 0B, | 0B, | 2B, | 2B, | 2B, | 2B, | 2B, |
| 2B, | 2B, | 2B, | 2B, | 0B, | 0B, | 3B, | 2B, |
| 2B, | 2B, | 0B, | 0B, | 2B, | 0B, | 2B, | 2B, |
| 0B, | 2B, | 0B, | 2B, | 0B, | 1B, | 2B, | 3B, |
| 0B, | 2B, | 0B, | 0B, | 2B, | 3B, | 2B, | 2B, |
| 2B, | 2B, | 2B, | 2B, | 2B, | 2B, | 2B, | 2B, |
| 2B, | 2B, | 0B, | 2B, | 2B, | 2B, | 2B, | 2B, |
| 2B, | 2B, | 0B, | 2B, | 0B, | 0B, | 0B, | 2B, |
| 0B, | 3B, | 0B, | 2B, | 0B, | 3B, | 2B, | 3B, |
| 2B, | 2B, | 0B, | 2B, | 0B, | 0B, | 0B, | 2B, |

*FIG. 14A*

| | | | | | | | |
|---|---|---|---|---|---|---|---|
| 0B, | 1B, | 0B, | 0B, | 0B, | 0B, | 0B, | 2B, |
| 2B, | 3B, | 1B, | 3B, | 1B, | 3B, | 3B, | 3B, |
| 1B, | 3B, | 0B, | 2B, | 0B, | 3B, | 2B, | 3B, |
| 2B, | 2B, | 3B, | 3B, | 2B, | 2B, | 2B, | 3B, |
| 3B, | 3B, | 0B, | 3B, | 2B, | 3B, | 2B, | 3B, |
| 0B, | 0B, | 2B, | 0B, | 2B, | 2B, | 3B, | 0B, |
| 0B, | 0B, | 0B, | 0B, | 0B, | 0B, | 2B, | 2B, |
| 0B, | 0B, | 2B, | 0B, | 0B, | 0B, | 3B, | 2B, |
| 0B, | 0B, | 0B, | 2B, | 0B, | 2B, | 2B, | 2B, |
| 2B, | 2B, | 2B, | 2B, | 0B, | 0B, | 0B, | 0B, |
| 2B, | 2B, | 0B, | 0B, | 2B, | 2B, | 2B, | 2B, |
| 2B, | 2B, | 2B, | 2B, | 2B, | 2B, | 3B, | 2B, |
| 0B, | 0B, | 0B, | 2B, | 0B, | 2B, | 2B, | 2B, |
| 2B, | 2B, | 2B, | 2B, | 2B, | 2B, | 2B, | 2B, |
| 2B, | 2B, | 2B, | 2B, | 2B, | 2B, | 2B, | 2B, |
| 2B, | 2B, | 0B, | 2B, | 0B, | 0B, | 2B, | 2B, |
| 3B, | 3B, | 0B, | 2B, | 2B, | 3B, | 3B, | 2B, |
| 2B, | 2B, | 3B, | 2B, | 2B, | 2B, | 1B, | 2B, |
| 2B, | 2B, | 2B, | 2B, | 2B, | 2B, | 3B, | 3B, |
| 2B, | 2B, | 3B, | 2B, | 2B, | 2B, | 3B, | 2B, |
| 2B, | 2B, | 2B, | 3B, | 3B, | 3B, | 3B, | 3B, |
| 0B, | 0B, | 0B, | 0B, | 0B, | 0B, | 2B, | 2B, |
| 0B, | 2B, | 0B, | 2B, | 0B, | 2B, | 2B, | 2B, |
| 2B, | 2B, | 2B, | 2B, | 0B, | 0B, | 2B, | 2B, |
| 2B, | 2B, | 0B, | 0B, | 2B, | 2B, | 2B, | 2B, |
| 2B, | 2B, | 0B, | 2B, | 0B, | 0B, | 0B, | 2B, |
| 2B, | 0B, | 0B, | 2B, | 0B, | 0B, | 0B, | 2B, |
| 2B, | 2B, | 2B, | 2B, | 0B, | 0B, | 2B, | 2B, |
| 2B, | 2B, | 0B, | 2B, | 2B, | 2B, | 2B, | 2B, |
| 0B, | 2B, | 3B, | 3B, | 3B, | 0B, | 3B, | 3B, |
| 0B, | 2B, | 2B, | 2B, | 2B, | 2B, | 3B, | 2B, |
| 2B, | 0B, | 0B, | 0B, | 1B, | 0B, | 3B, | 2B, |
| 0B, | 0B, | 0B, | 0B, | 2B, | 0B, | 2B, | 2B, |
| 2B, | 2B, | 2B, | 3B, | 3B, | 2B, | 3B, | 3B, |
| 3B, | 2B, | 2B, | 2B, | 3B, | 2B, | 3B, | 3B, |
| 2B, | 2B, | 3B, | 2B, | 3B, | 3B, | 3B, | 3B, |
| 3B, | 2B, | 2B, | 2B, | 3B, | 3B, | 3B, | 3B, |
| 0B, | 0B, | 0B, | 2B, | 0B, | 0B, | 0B, | 0B, |
| 0B, | 0B, | 0B, | 0B, | 0B, | 2B, | 2B, | 2B, |
| 0B, | 0B, | 0B, | 1B, | 0B, | 0B, | 0B, | 0B, |
| 0B, | 3B, | 0B, | 0B, | 0B, | 3B, | 0B, | 2B, |
| 0B, | 0B, | 0B, | 0B, | 0B, | 0B, | 0B, | 0B, |
| 0B, | 0B, | 0B, | 0B, | 0B, | 0B, | 0B, | 2B, |

*FIG. 14B*

| | | | | | | | |
|---|---|---|---|---|---|---|---|
| 0B, | 2B, | 0B, | 2B, | 0B, | 0B, | 0B, | 2B, |
| 2B, | 3B, | 0B, | 2B, | 0B, | 3B, | 0B, | 2B, |
| 0B, | 0B, | 2B, | 2B, | 0B, | 2B, | 2B, | 2B, |
| 0B, | 0B, | 2B, | 2B, | 2B, | 2B, | 2B, | 2B, |
| 2B, | 2B, | 0B, | 3B, | 2B, | 0B, | 0B, | 2B, |
| 2B, | 3B, | 0B, | 0B, | 2B, | 3B, | 2B, | 3B, |
| 2B, | 2B, | 2B, | 2B, | 3B, | 2B, | 2B, | 2B, |
| 2B, | 2B, | 2B, | 2B, | 3B, | 2B, | 2B, | 2B, |
| 2B, | 2B, | 2B, | 2B, | 2B, | 2B, | 2B, | 3B, |
| 2B, | 2B, | 2B, | 2B, | 2B, | 3B, | 2B, | 3B, |
| 2B, | 0B, | 0B, | 0B, | 0B, | 0B, | 0B, | 0B, |
| 2B, | 0B, | 0B, | 2B, | 2B, | 0B, | 2B, | 2B, |
| 2B, | 2B, | 0B, | 2B, | 0B, | 0B, | 2B, | 2B, |
| 2B, | 2B, | 0B, | 0B, | 2B, | 2B, | 2B, | 2B, |
| 0B, | 2B, | 2B, | 2B, | 0B, | 1B, | 0B, | 3B, |
| 0B, | 0B, | 0B, | 2B, | 0B, | 0B, | 0B, | 2B, |
| 2B, | 2B, | 2B, | 2B, | 0B, | 0B, | 2B, | 2B, |
| 2B, | 2B, | 0B, | 2B, | 2B, | 2B, | 2B, | 2B, |
| 0B, | 0B, | 0B, | 2B, | 0B, | 0B, | 0B, | 2B, |
| 0B, | 3B, | 0B, | 2B, | 0B, | 3B, | 2B, | 2B, |
| 0B, | 0B, | 0B, | 0B, | 0B, | 0B, | 0B, | 0B, |
| 0B, | 1B, | 0B, | 0B, | 0B, | 0B, | 2B, | 2B, |
| 0B, | 3B, | 3B, | 3B, | 0B, | 1B, | 1B, | 3B, |
| 0B, | 3B, | 0B, | 0B, | 0B, | 3B, | 2B, | 3B, |
| 2B, | 2B, | 2B, | 2B, | 1B, | 3B, | 3B, | 3B, |
| 2B, | 3B, | 0B, | 3B, | 0B, | 3B, | 2B, | 3B, |
| 0B, | 0B, | 0B, | 0B, | 0B, | 0B, | 0B, | 0B, |
| 0B, | 0B, | 0B, | 0B, | 0B, | 0B, | 0B, | 0B, |
| 0B, | 2B, | 0B, | 2B, | 0B, | 0B, | 0B, | 2B, |
| 0B, | 3B, | 0B, | 2B, | 0B, | 3B, | 0B, | 2B, |
| 2B, | 2B, | 2B, | 2B, | 0B, | 0B, | 0B, | 2B, |
| 0B, | 0B, | 0B, | 2B, | 2B, | 0B, | 0B, | 2B, |
| 0B, | 2B, | 0B, | 2B, | 0B, | 0B, | 0B, | 3B, |
| 0B, | 3B, | 0B, | 2B, | 0B, | 2B, | 0B, | 2B, |
| 2B, | 2B, | 2B, | 2B, | 2B, | 2B, | 0B, | 2B, |
| 0B, | 2B, | 2B, | 0B, | 2B, | 2B, | 2B, | 2B, |
| 2B, | 2B, | 0B, | 3B, | 2B, | 0B, | 0B, | 2B, |
| 2B, | 3B, | 0B, | 2B, | 2B, | 3B, | 2B, | 2B, |
| 2B, | 2B, | 2B, | 2B, | 2B, | 2B, | 0B, | 2B, |
| 0B, | 0B, | 2B, | 2B, | 2B, | 3B, | 2B, | 2B, |
| 2B, | 2B, | 2B, | 2B, | 2B, | 2B, | 0B, | 3B, |
| 2B, | 0B, | 2B, | 3B, | 2B, | 3B, | 2B, | 2B, |

*FIG. 14C*

HARDWARE IMPLEMENTATION OF 2 LINE/11 ELEMENT PREDICTOR

BACKGROUND OF THE INVENTION

This is a continuation-in-part of a copending patent application, "Hardware Implementation of 2 Line/11 Element Predictor", Ser. No. 165,814, filed July 3, 1980, now abandoned.

This invention is an improved digital data compressor and more specifically comprises a predictor which can be used to compress digital data produced by the raster input scanning of both text and halftone images.

Data is usually compressed prior to transmission to reduce bandwidth, or prior to storage to reduce memory requirements. For this purpose, many encoding algorithms are available, most based on run length encoding of some kind. In the case of text transmission or storage, one example would be to transmit the run lengths of the (white space) strings of zeros, and the actual patterns of the (black print) one bits. In this case the compression ratio will improve as the zero strings become longer and the one bits become fewer.

With a given set of text documents, the compression ratio can be improved if a suitably designed predictor operates on the data prior to the encoding step. A predictor looks at the previous bits of the current line and the immediately adjacent bits of the previous line or two, and predicts from those bits what the current bit is. The actual current bit is then compared to the prediction. If the prediction is correct, the predictor output is a zero; if incorrect, the output is a one. For text inputs, a predictor may make the correct prediction as much as 99% of the time, resulting in a predictor output comprising long strings of zeros, an occasional one bit, and a good compression ratio at the encoder.

Of course, the transmitted or stored data is in predicted and encoded form, and cannot be subsequently used after reception or retrieval from storage until it has been decoded and depredicted to reconstitute the original video. That results in the requirement that a compressor and decompressor be included in the system at added cost. However, the reduced bandwidth or memory requirement usually more than compensates for the increased hardware cost of the compressor and decompressor. Of course, the cost of this hardware should be minimized.

This hardware must also be designed to operate at high data rates. A common requirement is that the data for a full page of text at a reasonable level of image quality be transmitted in several seconds, and the compressor must keep up with this real time data rate.

A severe complication occurs when the original document is a halftone image. Not only is there very little white space in the original data, but there also is a screen pattern which systematically simulates continuous tones in rapidly changing black and white patterns. With a halftone original, predictors usually perform poorly. Thus, there is a need for a predictor that will compress halftone as well as text inputs.

One method of predicting a mixed set of documents is to use adaptive predicting. Here, two predictors are used, one designed for halftone and one for text, for example. Both operate on the data and at the end of the run, a comparison is made to determine the better predictor. Then, the data is put through the system a second time, using the selected predictor pattern. The main disadvantages of this system are that the throughput is less than half of that of a system using one predictor for both kinds of originals, and the hardware is more complicated.

The compression of a predictor can be improved by adding more bits to the pattern, but that increases hardware costs, and is limited by state-of-the-art ROM size. Also, a variation of the shape of the pattern will allow the predictor more effectively to compress some kinds of text at the expense of others. What is required is one predictor, using a minimum of bits, which can operate at high speed to produce a good compression ratio for a typical mix of text and halftone images.

SUMMARY OF THE INVENTION

It was discovered that with a text input, the bits immediately surrounding the current bit are of great value in predicting the current bit, but that with halftone images, the most important bits are the ones on the same or previous lines that are removed from the current bit by a distance corresponding to the screen pitch. Thus, to use the described embodiment as an example, bits within three pixels of the current bit are useful to predict text but bits separated by five, seven, eight and nine pixels are better to predict halftone images screened at 133, 100, 85 and 70 dots per inch, respectively. By using a pattern comprising six bits located close to the current bit, and using an additional five bits that are more distant, a predictor that works well on a variety of input documents can be produced.

The speed at which this predictor can process data is also an important aspect of the circuit design. One common method of increasing circuit speed is to process a plurality of bits in parallel. However, in the case of a predictor, this is usually impossible since the previous bit is needed in the process of predicting the present bit, resulting in a serial operation.

To enable this predictor to process four bits per clock, the pattern is limited to a pattern where only one bit in the preceeding four bit nibble is used, and a two level pipeline circuit is provided to allow the prediction to take place in two steps. The first level uses a pattern of ten bits in the current and previous lines to produce eight outputs which are clocked into the second level. On the next clock the previous nibble, just computed, is used to select the correct four outputs from the eight.

The resultant circuit is simple, can be built at low cost, and efficiently compresses halftone and text inputs at high speed.

BRIEF DESCRIPTION OF THE DRAWINGS

FIG. 1 is a simple block diagram of the relationships between the compression and decompression units.

FIG. 2 is a prior art predictor pattern.

FIG. 3 is a simple predictor pattern for a halftone input.

FIG. 4 is the preferred bit pattern.

FIG. 5 is a diagram showing the coverage of the various components of the preferred bit pattern.

FIG. 6 shows the effectiveness of the preferred pattern components in table form.

FIG. 7 shows the bit patterns divided into four bit nibbles.

FIGS. 13A and 13B are the contents of the Error PROMS.

FIGS. 14A and 14B are the contents of the Prediction PROMS.

DETAILED DESCRIPTION OF THE INVENTION

Figure 8:
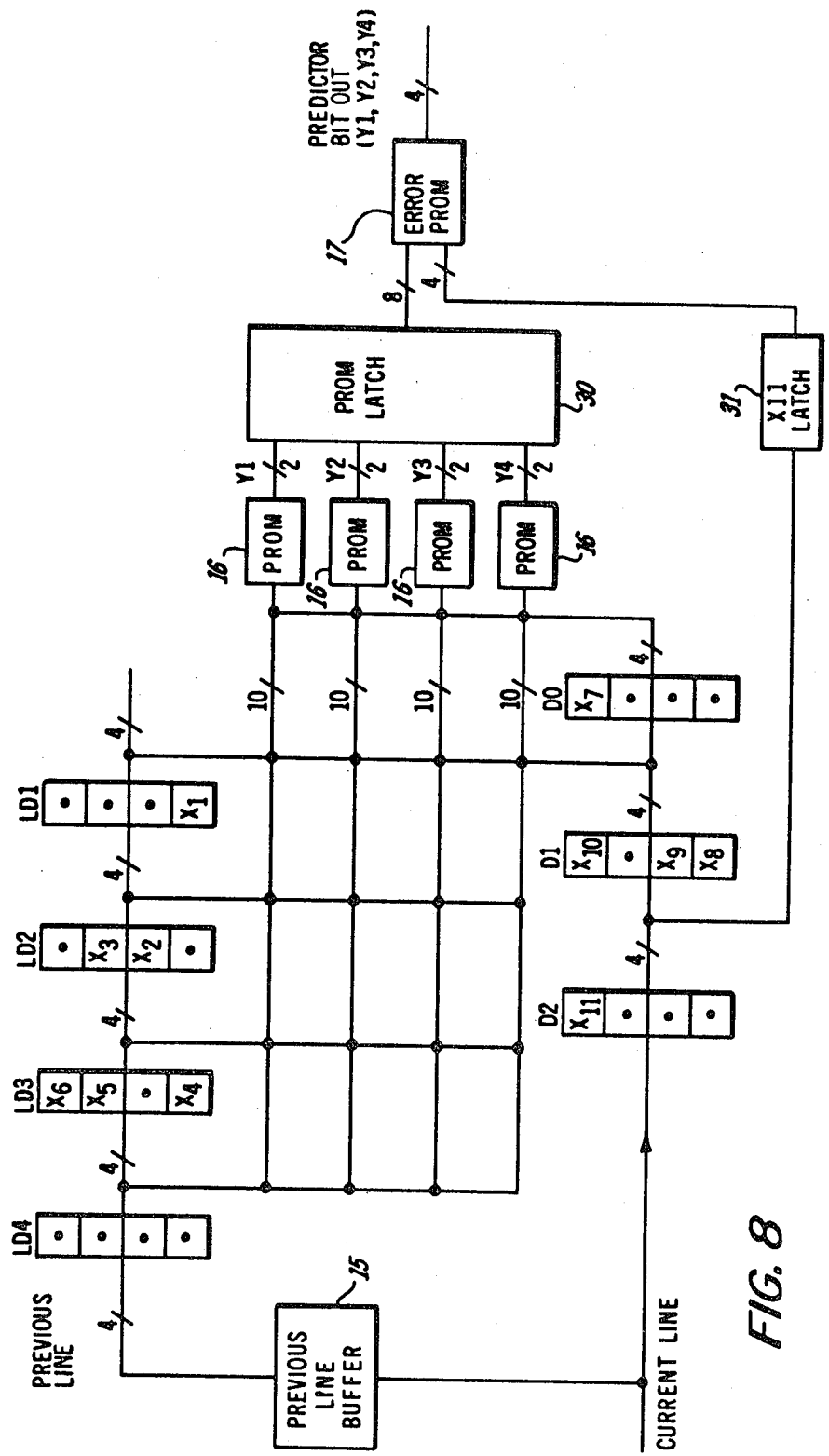
FIG. 8 is a simplified circuit for performing this prediction process.

FIG. 1 shows the relationships between the elements of a typical system which uses data compression. The data originates in an image input terminal, IIT, which typically scans an original to produce a raster of pixels. If the original is text, the data will be thresholded to produce a series of one or zero bits. If the original is an image, it is assumed that either the original is a halftone, or that the original is a continuous tone image subsequently screened in the IIT. Therefore, the input to the area predictor 10 is assumed to be either text or halftone data.

The area predictor 10 uses selected bits of the video of the previous line and previous bits of the current line to predict the current bit. A correct prediction results in a zero bit output to the encoder 11, and incorrect prediction results in a one bit.

The encoder 11 can be any one of a number of well known encoding circuits or algorithms. Run length and Huffman code encoders, and their variants, are suitable. Of course, the exact bit pattern of the predictor is chosen to match the mixture of input document types. The compressed output of the encoder 11 is then sent to the communication channel or storage medium 12.

After reception of the transmission or access from storage, the decoder 13 reverses the encoding process and the depredictor 14 reverses the prediction process to reconstitute the original video which can then be printed on an image output printer, IOT, to produce a hard copy.

FIG. 2 is an example of a prior art predictor pattern. Y is the bit to be predicted, $X_4$ is the previous bit on the current raster line and $X_1$, $X_2$ and $X_3$ are the bits immediately above the Y bit on the previous raster line. These X bits have great predictive value with a text input. However, because of the cyclical nature of halftone data, this pattern cannot be used with halftone image material. The inclusion of additional bits in the FIG. 2 pattern would increase the effectiveness in any case.

FIG. 3 is a pattern which would work well for halftone data of a specific pitch, that is one with a dot to dot distance of eight pixels. The inclusion of additional bits to the immediate right and left of the X bit would enable the efficient prediction of halftone data over a range of values of dots-per-inch.

Combining the concepts of FIG. 2 and FIG. 3 and optimizing the resultant pattern for the specific mix of documents expected and for the characteristics of the encoding algorithm, through computer simulation and analysis, resulted in the two line eleven element pattern of FIG. 4. The six bits closest to the predicted bit Y enable efficient prediction of text while the five leftmost bits enable efficient prediction of halftone data of 70, 85, 100 and 133 dots per inch. The second, third and fourth bits to the left of Y are ot used secondarily because they contribute little to the predictor operation and primarily because the exclusion of these bits enables the parallel prediction of four bit nibbles ($Y_1$, $Y_2$, $Y_3$, $Y_4$ of FIG. 7) with a minimum of circuitry, as will be explained below.

FIGS. 5 and 6 illustrate the conceptual basis for the ability of the preferred predictor to enable the efficient compression of several kinds of text and halftone data. T1 and T2 refer to the two different kinds of textual material, for instance, typed pages in portrait mode and forms in landscape mode. H1 and H2 refer to halftone data at two different pitches, 85 and 133 dots per inch.

The PRT1 column of FIG. 6 shows the percent error which will occur at the prediction comparison step when a predictor with a bit map of FIG. 4, optimized for a T1 type of text is used on all four kinds of documents. Similarly, the PRT2, PRH1 and PRH2 columns show the percent error resulting from predictors optimized for T2, H1 and H2 documents, respectively. Finally, the PAV column shows the percent error of the pattern of FIG. 4 when used on the four kinds of documents. Ideally, the PAV values for each row will be equal to the lowest error rates on each line. Inevitably, however, the compromise pattern will not work as well in each case as the one optimized for that document type, but the overall performance, as shown, is good enough to allow the system to operate successfully with a mixed input. The actual average error rate for a mixed set of input documents with the preferred predictor pattern is in the area of 1%. The worst case is for H2 type documents, but even there, a 1.5:1 system compression ratio is realized, with the worst case type of pictures.

FIG. 5 is a diagram of the concept of adding bits to the predictor pattern to increase the area of effective operation. Certain bits in the pattern enable the efficient prediction of certain kinds of input. The X bits closest the current Y bit enable the T1 and T2 areas while the more distant bits enable the H1 and H2 areas. The total pattern covers the entire range of document types. The optimization of a bit pattern is intended to minimize the intersection between document types. The ideal case will be a predictor which operates on each document type mutually exclusively.

FIG. 8 is a simplified schematic of the circuit required to predict four bits per clock period. The previous line buffer 15 is an FIFO shift register (or equivalent) exactly one scan line minus eight bits long. In operation, four bits video nibbles are received on the current line and are shifted, in parallel, in one line through registers D2, D1 and D0, and in the other line, through the previous line buffer 15 and registers LD4, LD3, LD2 and LD1. The latter line provides previous line data, and the former, current line data, to the address inputs of the four PROMs 16.

More specifically, for the previous line data, bits $X_1$ through $X_6$, and for the current line data, bits $X_7$ through $X_{10}$, are supplied as ten address inputs to the Y1 PROM. The $X_{11}$ bit is not supplied to the Y1 PROM. The Y1 PROM output is two bits, one bit signifying the correct predictor if the $X_{11}$ bit is a one, the other the predictor output if the $X_{11}$ bit is a zero.

During this same clock period the bit immediately to the right (in FIG. 7) of each bit marked "X" is used as an address bit for the Y2 PROM. Similarly, the second and third bits to the right address the Y3 and Y4 PROMs. The result is that eight possible PROM 16 output bits are clocked into the PROM latch 30. At the same time the four $X_{11}$ bits are clocked into the $X_{11}$ latch 31.

During the next clock period, the error PROM 17 receives the four sets of two possible predictor outputs from the PROM latch 30 and uses the four $X_{11}$ bits to determine each correct one, resulting in a Y1, Y2, Y3 and Y4 output. During this same clock period, the PROM and $X_{11}$ latches are loaded as before to enable the next cycle. The result is a four bit output for every clock.

Figure 9:
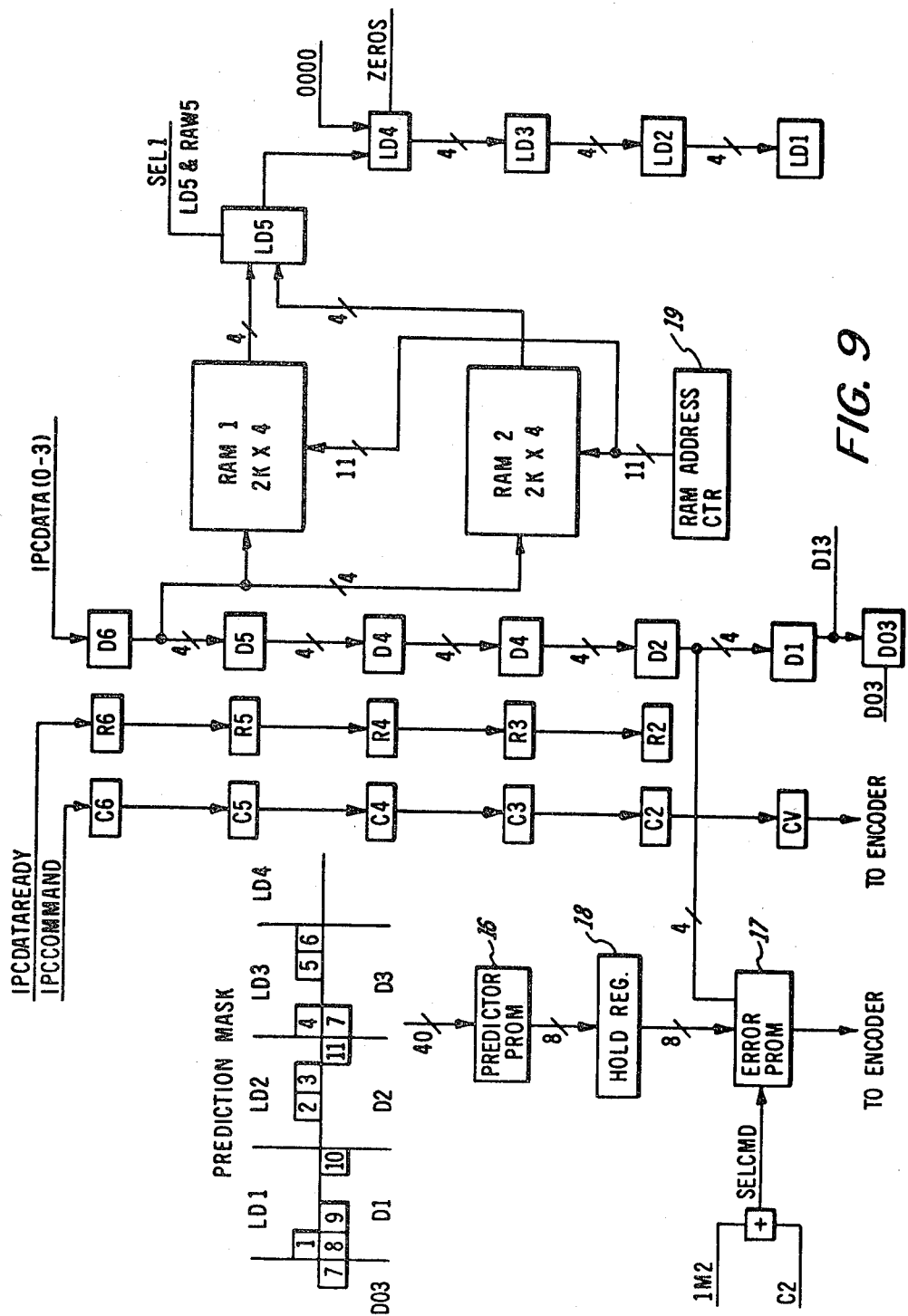
FIG. 9 is a more detailed block diagram of a circuit for implementing the predictor process.
Figure 10A:
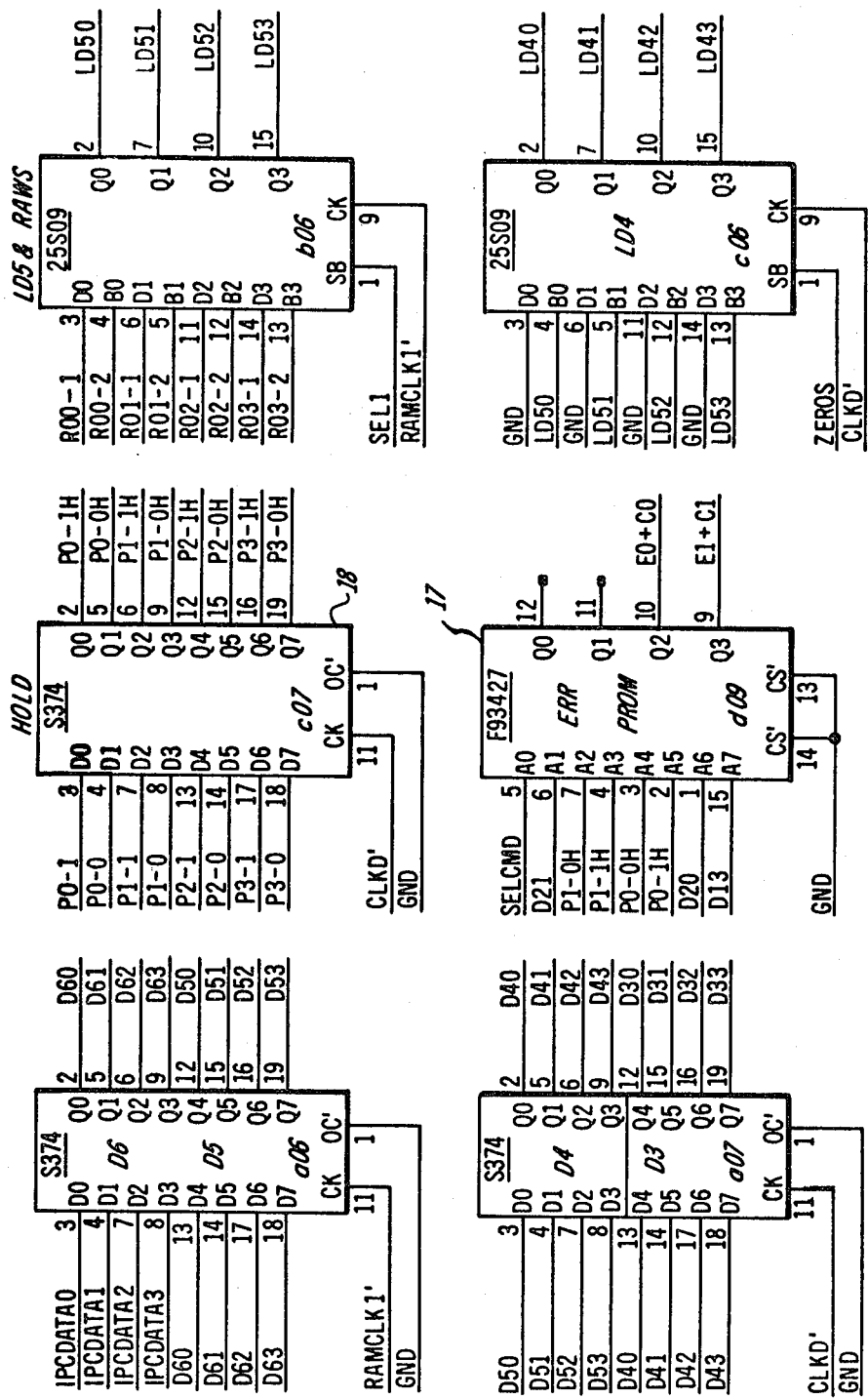
FIG. 10 is a schematic diagram of the registers and predictor PROMs.
Figure 10B:
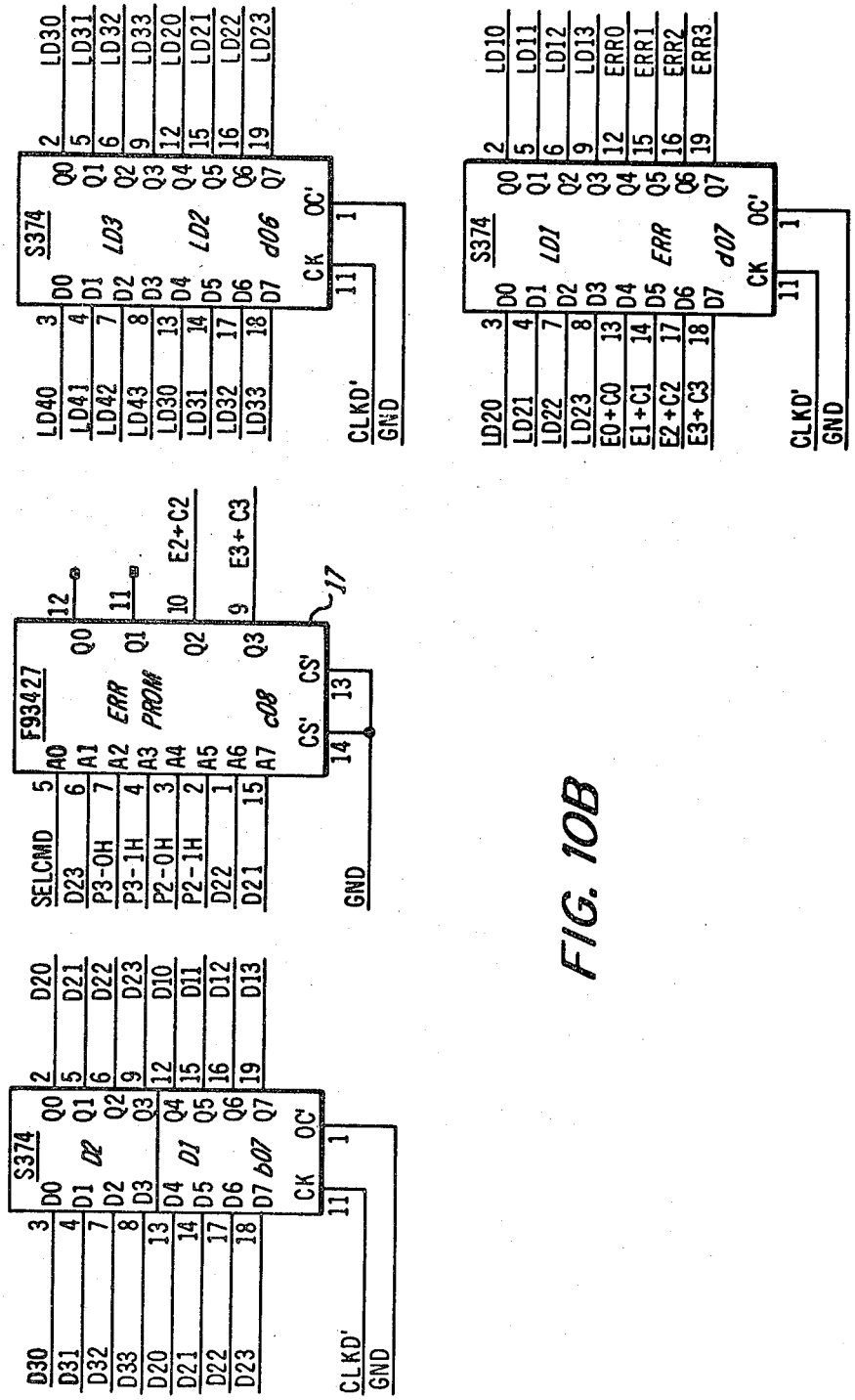
Figure 10C:
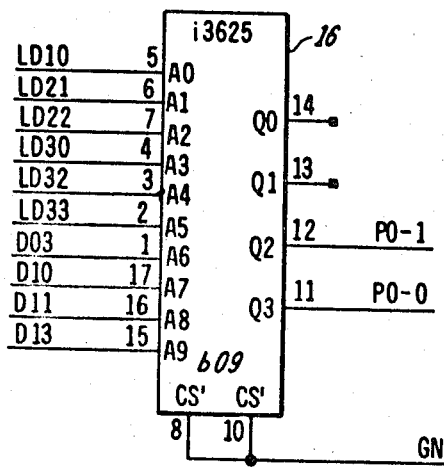
Figure 10C:
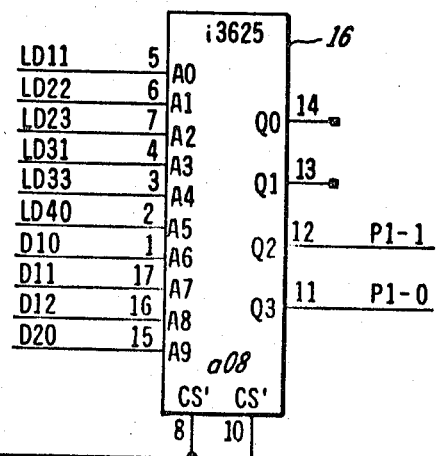
Figure 10C:
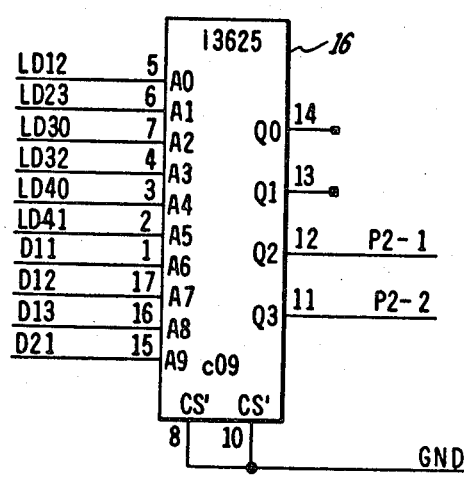
Figure 10C:
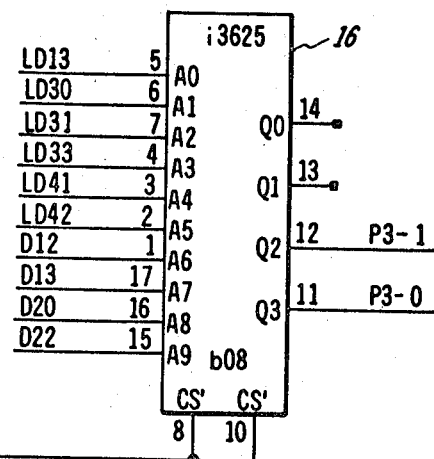
Figure 11:
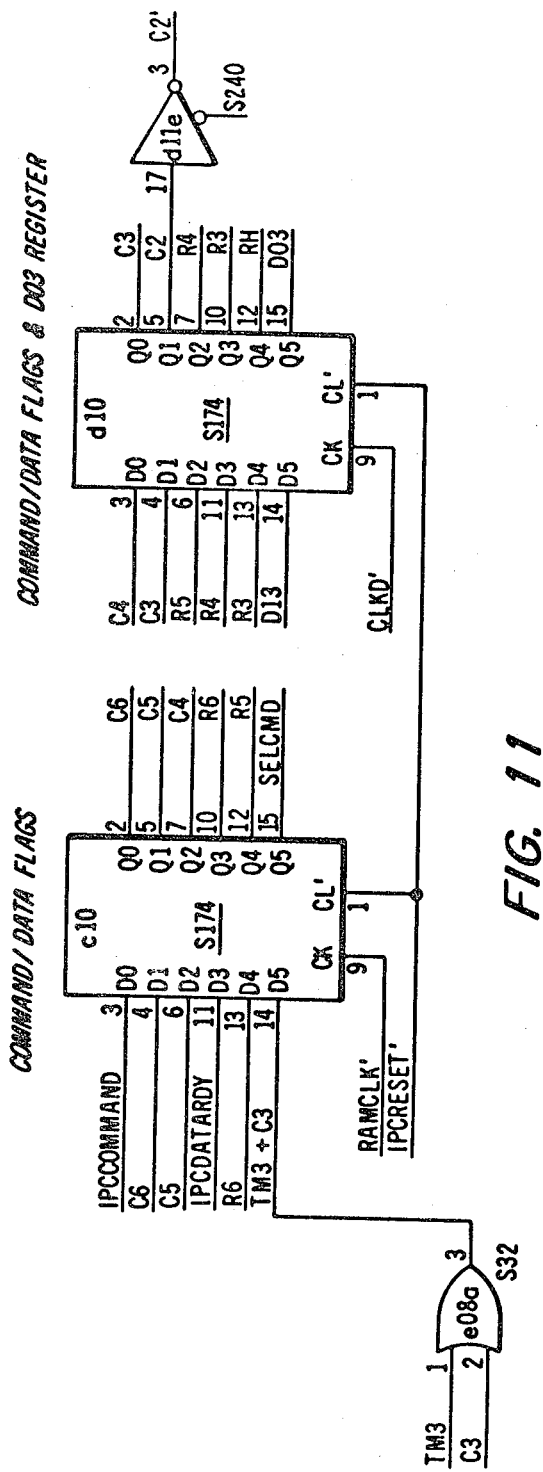
FIG. 11 is a schematic diagram of the command and data flag flip-flops.
Figure 12A:
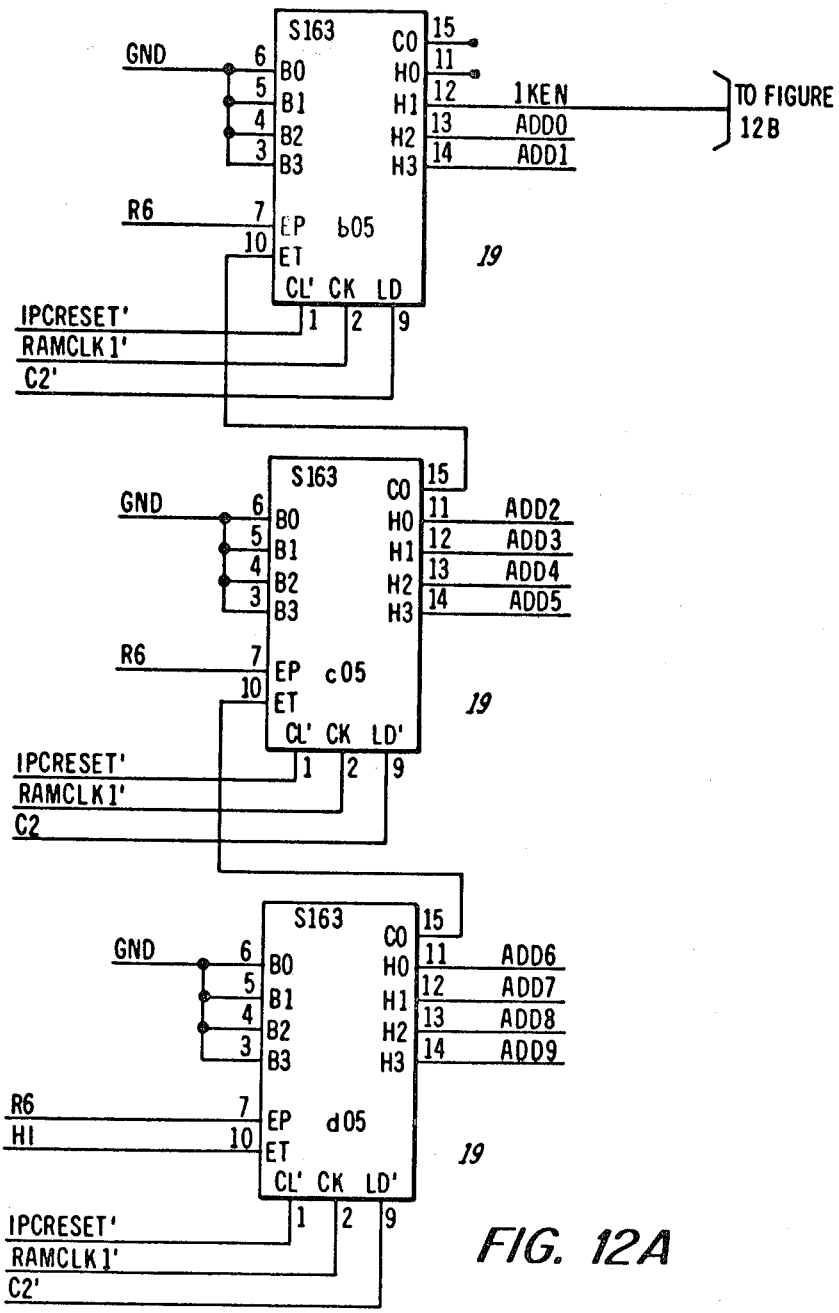
FIG. 12 is a schematic diagram of the buffer memory.
Figure 12E:
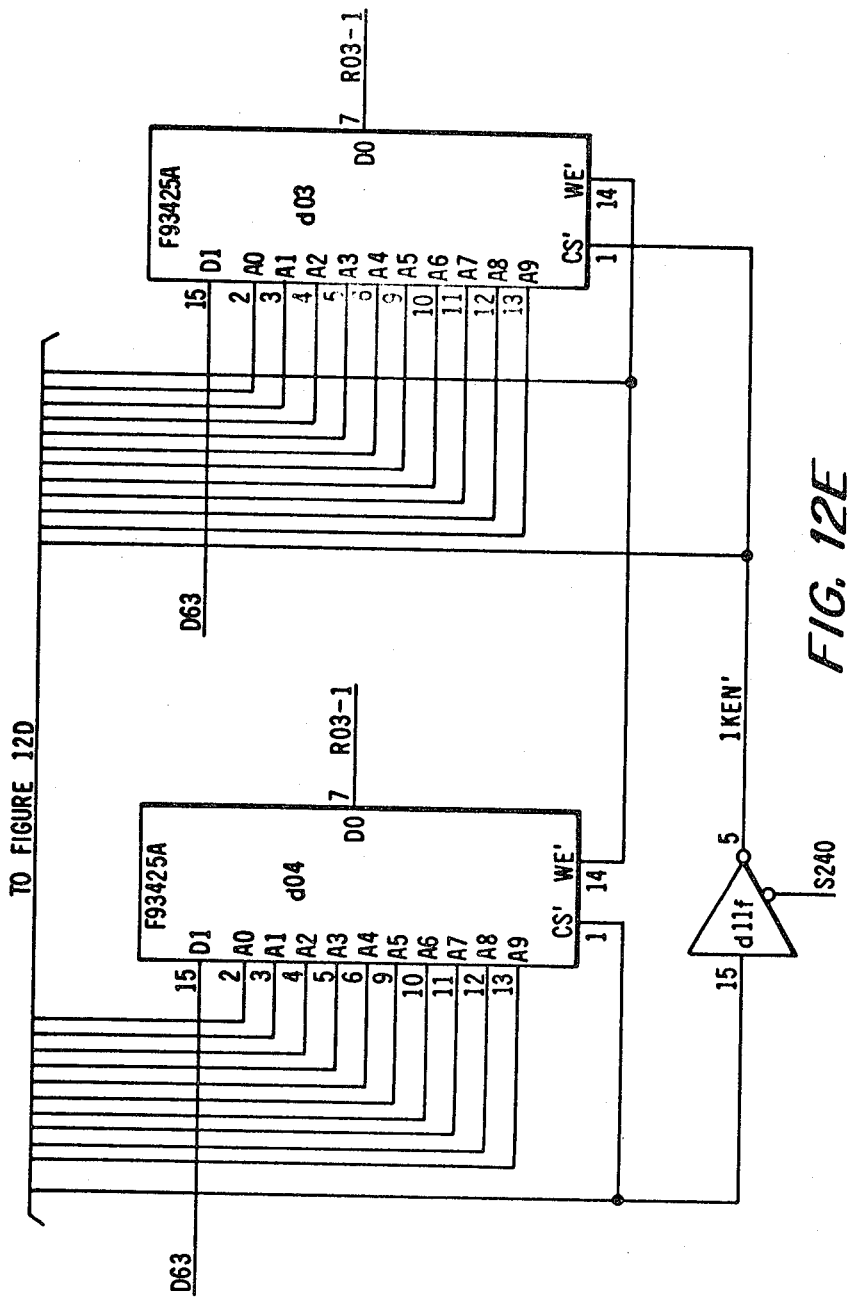

FIG. 9 is a less simplified block diagram of the circuit for performing this prediction process, and FIGS. 10, 11 and 12 are the associated detailed schematic diagrams.

In FIG. 9, each four bit input word is received at four bit register D6 and is shifted on each clock pulse through registers D5, D4, D3, D2 and D1. The contents of these registers are then available to the predictor as the current line of information as shown in the "Prediction Mask" portion of FIG. 9.

The output of register D6 is also coupled to RAM 1 and RAM 2 where the data is stored until the next raster. At that time, the data is output and shifted through registers LD5, LD4, LD3, LD2 and LD1 to provide the previous line data for the predictor.

In operation, while one RAM is being loaded with current line data, the other is outputting previous line data; and at the end of each scan line, the functions are reversed. A RAM address counter 19 provides address inputs to the RAMs.

FIG. 8 and accompanying text describes a two-step process for predicting each four bit nibble. This is shown in more detail in FIG. 9 as follows. Forty bits of data comprising the Prediction Mask are supplied to the Predictor PROM 16 as address inputs, to generate an eight bit output. Then the four bit D2 register output is used, along with the eight bit output of PROM 16 coupled through register 18, to address the error PROM 17 to produce the final four bit output.

The previous and current line data registers D6, D5, D4, D3, D2, D1, LD5, LD4, LD3, LD2 and LD1 are shown in schematic form in FIG. 10, and are interconnected to provide the data paths described in the text accompanying FIG. 9.

Because the data on the IPC Data 0-3 lines is clocked into the D6 register on all clocks whether it is valid or not, a valid data bit is transmitted along with each valid data nibble. In FIG. 9, this is shown as an IPC Data Ready signal input to flip-flop R6. Thereafter the valid data bit is clocked down through flip-flops R5 and R4 as the data is clocked through the current line registers D6, D5 and D4. Thereafter, the valid nibble in register D4 will be clocked into register D3 and subsequent registers only if register D4 receives a valid nibble. Therefore, registers D4 through D0 always have valid nibbles. As the valid nibbles are clocked through the D registers, the corresponding nibbles of the previous scan line are clocked through the LD registers so that the arrangement of the pattern nibbles is always in accordance with the Prediction Mask of FIG. 9. The data valid bit is always available to indicate whether the data at the same level is valid. Similarly, an IPC Command bit is shifted through flip flops C6, C5, C4, C3, C2 and CV to indicate that a line is complete. The actual devices are shown in FIG. 11, as shift registers c10 and d10. The line complete signal is used to switch RAM 1 and RAM 2 as described above.

On the first line of each page, the previous line in the mask is defined as all zeros. To guarantee this, a Zeros signal is used to control the LD4 register of FIG. 9 (actually a multiplexing latch) to select an all zero input which forces the previous line data in the registers to zero regardless of the RAM contents. All zeroes are also used for the previous line when constructing the first line after a prediction break.

The LD5 register of FIG. 9 is also a multiplexer, and is controlled by the line complete bit to select an output, alternately, from each of the RAMs. This device is shown in schematic form as device b06 of FIG. 10.

In the schematic of FIG. 10, the Hold register 18 provides buffering between the predictor PROM 16 and the error PROM 17.

FIG. 11 is a schematic of the command and data flag flip-flops implemented from register devices c10 and d10.

FIG. 12 comprises the RAM address counter 19, which is automatically incremented for each clock corresponding to each load and read cycle. The RAM itself is implemented from RAM devices a04, b04, c04, d04, a03, b03, c03 and d03.

FIGS. 13A and 13B are the code for the Error PROMs 17 of FIG. 10, and FIGS. 14A and 14B are the code for the Predictor PROMs 16 of FIG. 10.

As explained above, the prediction process is accomplished in two steps. In the first step, the leading ten elements are used to produce two alternatives for each bit position in the four bit output nibble. These ten elements are labeled 1-11 in FIG. 9, ad LD10 through LD42 and D03 through D22 at the inputs to the Predictor PROMs 16 of FIG. 10. For example, the first bit in the LD3 register of the Predictor Mask is line LD31 in FIG. 10.

The four Predictor PROMs 16 comprise a 1024 by 4 bit memory and contain the data of FIGS. 14A and 14B. The first line indicates the four bit contents of locations 0 through 7 in octal. The leading two outputs bits are not used, as shown in the schematic, and the suffix, B, is added to indicate that the number is written in octal notation.

The operation of each Predictor PROM, therefore, is to receive the ten leading predictor elements and to produce two outputs, one of which will be chosen as the correct output at the next stage. Specifically, in FIG. 10, the left most Predictor PROM 16 uses the ten inputs LD10, LD21, LD22, LD30, LD32, LD33, D03, D10, D11 and D13 to produce two outputs P0-1 and P0-0. The other three Predictor PROMs function identically to produce the remaining outputs, P1-1, P1-0, P2-0, P3-1 and P3-0.

These eight intermediate outputs are applied to the Error PROMs 17 along with the remaining four predictor elements D13-D22 and the four data bits to be predicted D20-D23.

To explain the operation of this stage, consider the upper half of FIG. 13A which corresponds to one half of the FIG. 10 Error PROM 17 labeled d09. The inputs are the two intermediate bits P0-0H and P0-1H; the last predictor element D13; and the data bit D20. The output Q2, labeled E0+C0 in the schematic, is as shown and may be described as the result of the first two logic equations at the bottom of FIG. 13A.

Inspection of the Prediction Mask of FIG. 11 would, at first glance, indicate that the data bit should be D30 (instead of D20) and the last element should be D23 (instead of D13). However, the second predictor stage occurs one clock period later than the first predictor stage, during which period the data in the Prediction Mask is shifted one nibble to the left.

The reminning three Y bits are processed identically, except that each is located one bit to the right of the last. Thus, the second stage predictor element is D20 and the data bit is D21.

The first column in FIGS. 13A and B and the SelCmd input lines to the Error PROMs 17 provide a capability to insert "End of Line" and other commands into the data stream on command.

The invention is not limited to any of the embodiments described above, but all changes and modifications thereof not constituting departures from the spirit and scope of the invention are intended to be covered by the following claims.

What is claimed is:

1. A one-shot predictor circuit for mixed mode documents comprising:
   a first-in, first-out buffer for delaying the input bit nibbles by one raster scan line,
   a previous line storage means for storing a plurality of nibbles delayed by said buffer,
   a current line storage means for storing a plurality of input nibbles,
   a first memory means addressed by said previous line and current line storage means to output a multiple of m bits of possible predictor outputs, and
   a second memory means addressed by the outputs of said current line storage means and said first memory means to output an n bit predictor output nibble.

2. The cirucit of claim 1 wherein n equals four, and wherein the output of said first memory means is eight bits.

3. The circuit of claim 2 wherein said memory means are PROMs.

4. The circuit of claim 3 wherein said storage means are registers.

5. The circuit of claim 4 wherein either of said registers is segmented into four bit segments, and further comprising a plurality of data valid flip-flops, one flip-flop associated with each segment, each stored flip-flop bit indicating whether or not the data in the associated segment is valid.

6. The circuit of claim 5 wherein both of said registers are segmented, and where the stored bit indicates whether or not the data in both associated segments is valid.

7. The circuit of claim 6 further comprising a plurality of end-of-line flip-flops associated with said register segments, each stored end-of-line flip-flop bit indicating whether or not the nibble in the associated segment represents the last nibble of the line.

8. The circuit of claim 7 wherein said buffer is a RAM, and further comprising a counter, which is incremented each time an input nibble is received by said circuit, for addressing said RAM.

9. The circuit of claim 8, wherein said RAM comprises two sections, both addressed by said counter, one for storing current line data and one for outputting previous line data.

10. The circuit of claim 9 further comprising a multiplexer for alternately selecting the output of said RAM sections on each successive scan, and for coupling said selected RAM output to said previous line registers.

* * * * *